Patented Oct. 28, 1947

2,429,971

UNITED STATES PATENT OFFICE 2,429,971

METHOD OF PREPARING A THERAPEUTIC ZINC PEROXIDE COMPOSITION

James H. Young, Niagara Falls, N. Y., assignor to E. I. du Pont de Nemours & Company, Wilmington, Del., a corporation of Delaware No Drawing. Application August 2, 1943, Serial No. 497,052

3 Claims. (Cl. 167—72)

This invention relates to oxygen-liberating compounds useful in therapy and to a new and improved process for preparing these compounds. More especially, it relates to an improved zinc peroxide and to the method for preparing this zinc peroxide by the incorporation therein of activating agents which are relatively insoluble in water and aqueous liquids.

The germicidal properties of zinc peroxide preparations have been known to the medical art for a considerable period of time and the peroxide is now used extensively for the treatment of anaerobic and microaerophylic infections, as well as for the treatment of certain aerobic infections. Thus, the substance is widely used in the treatment of external skin afflictions, such as ulcers, serious wounds, and anaerobic wound infections caused by streptococci.

In order to be effective in the treatment of these infections it is essential that the zinc peroxide have its oxygen-evolving ability enhanced or increased by the incorporation therein of suitable materials serving to bring about the more rapid release of oxygen. Therapeutic zinc peroxide preparations which evolve larger amounts of oxygen over a treatment period of specified duration, for example twenty-four hours, and which are characterized by a higher rate of gas evolution during the latter stages of the treatment period have been found most desirable for the specified therapeutic uses.

Accordingly, in preparing zinc peroxide of therapeutic grade suitable for use in the treatment of skin diseases and infections, it has in the past been usual to improve the germicidal effectiveness of the compound by incorporating therein certain catalytic agents which increase to a very considerable degree the rate at which the zinc peroxide evolves oxygen when brought into contact with the wound or infection. The compounds so introduced act as catalytic agents and increase the rate of gas evolution, and they have previously been compounds which would dissolve in the aqueous slurry, in which form the zinc peroxide is applied to the infection or wound, thus yielding metallic ions which were regarded as the catalytic agents enhancing the gas evolution rate of the peroxide. In preparing such compositions it has heretofore been usual to include water-soluble, ionizable compounds of certain metals in the zinc peroxide preparation, so that when the preparation was made up into a slurry and applied in the form of a dressing to the wound or infection, the metal ions would serve as the desired catalytic agent. Among such water-soluble ionizable compounds added to zinc peroxide of therapeutic grade have been compounds of manganese, cobalt, copper, and gold, which compounds dissolve in the water present in the zinc peroxide slurry to introduce manganous, cobaltous, cupric and auric ions respectively into the therapeutic preparation. In preparing zinc peroxide in a form suitable for use an an antiseptic and therapeutic agent for the specified purposes it has uniformly been considered essential in the past that the catalytic agents added thereto to increase its rate of gas evolution should be water-soluble and ionizable compounds such as would operate by dissolving in the water present to supply the respective metallic ions, the ions, rather than the compounds themselves, being regarded as the agents serving to catalyze the zinc peroxide.

Moreover, in the activation previously of therapeutic zinc peroxide by the incorporation therein of water-soluble ionizable compounds, it has to some extent been contemplated that the exact adjustment of the rate of gas evolution and the activation of the peroxide would be carried out by the physician or surgeon who prepares the aqueous slurry, prior to its application to the wound or infection. In practice this has not been satisfactory, for the activation of zinc peroxide by the incorporation of the catalytic agents therein has required not only considerable time, but also skilled chemical ability, neither of which is ordinarily available to the practicing physician. As careful adjustment of the degree of activation effected by incorporation of the water-soluble ionizable compounds is essential, activation to too great an extent causing the release of an initial burst of oxygen during the earlier stages of treatment the preparation being, however, practically inactive during the latter stages, it has now been appreciated that the regulation of the activity of the therapeutic agent is preferably effected during the manufacturing operations and not by the physician.

Unfortunately the use of the water-soluble metallic compounds previously considered essential by the prior art in connection with therapeutic zinc peroxide has involved certain difficulties, both in the manufacture of the therapeutic preparations, as well as in their use for their intended purposes. The difficulty with utilizing the water-soluble metal compounds is that gas evolution from zinc peroxide is catalyzed, not only when the preparation in the form of a slurry is applied to the wound or infection, but also wherever the metal compound is in contact with the zinc peroxide in the presence of water during the manufacturing process. Because of this considerable losses in active oxygen have taken place during such steps as filtering, washing, drying and sterilizing the commercially prepared product, preparatory to packaging it for utilization by physicians and surgeons.

However, I have now found that it is unnecessary to utilize the water-soluble metallic compounds previously considered essential as catalytic agents which increase the gas evolution rate of therapeutic grade zinc peroxide, and that certain metallic catalysts, particularly the metals of the platinum group, although not water-soluble, possess many advantages over the soluble ionizable compounds previously considered essential. These advantages are evident, not only during the commercial preparation of the zinc peroxide, but also in its utilization for the treatment of wounds, infections and diseases. Among such metals, employed in finely divided form as catalytic agents in the therapeutic zinc peroxide, are platinum, palladium, rhodium, ruthenium, iridium, and osmium, particularly those of the second and third transition series in group VIII of the periodic table. Surprisingly enough, not only do these finely divided metals possess effective catalytic action when incorporated in zinc peroxide of therapeutic grade, but for many purposes these insoluble compounds are actually more active than the previously utilized water-soluble compounds. It is evident that the earlier viewpoint that the phenomenon of catalysis in connection with the evolution of gas from zinc peroxide was an ionic phenomenon is erroneous, as I have found that even though the catalysts are not water-soluble and will not supply metal ions to aqueous slurries of the preparation, the desired catalytic action is nevertheless obtained.

It is accordingly an object of this invention to prepare zinc peroxide of therapeutic grade of more satisfactory character when utilized for the treatment of wounds and infections by incorporating in zinc peroxide relatively small amounts of one or more of the metals of the platinum group, more particularly one or more of the metals platinum, palladium, rhodium, ruthenium, iridium and osmium.

Since I have found that the uniform distribution of the finely divided metal catalysts throughout the zinc peroxide is desirable in order to secure the desired increase in gas evolution rate, another object of this invention is to render available a process by which these metals may be uniformly distributed throughout the mass of zinc peroxide whose gas evolution rate is to be catalyzed. Still another object of this invention is to render available zinc peroxide of therapeutic grade characterized by greater activity and higher gas evolution rate than previously available commercially, by substituting for the water-soluble metal compounds previously considered essential, certain metals exhibiting catalytic action in the catalytic state, these metals being more particularly those selected from the group which comprises those of the second and third transition series in group VIII of the periodic table. These and still further objects of my invention will be apparent from the ensuing disclosure of certain preferred embodiments thereof.

Zinc peroxide of therapeutic grade may be readily prepared by reacting a zinc salt with an aqueous alkaline solution of an active oxygen-yielding compound such as hydrogen peroxide or sodium peroxide. Such a process is described, for example, in Klabunde et al., Patent No. 2,304,104. Although considered chemically as zinc peroxide, the commercial therapeutic preparation thus prepared usually contains considerable quantities of other zinc compounds, principally zinc oxide, zinc hydroxide and zinc carbonate, and may contain other impurities in the event chemically pure zinc salt is not used in its preparation.

The finely divided metal or metals of the platinum group, it being possible to utilize one metal alone or several in admixture, may be directly incorporated with the zinc peroxide therapeutic product. There are several other ways, however, in which the finely divided metal may be incorporated with the peroxide, it being desirable in all cases to secure thorough distribution of the catalyst. The catalytic metal may, if desired, be added to the zinc salt, or to the reaction mixture during the process wherein the zinc salt is reacted with the active oxygen-yielding compound such as hydrogen peroxide or sodium peroxide. Or, alternatively, it may be added during precipitation and recovery of the therapeutic product. However, ordinarily I not prefer to introduce the finely divided metal catalyst during the manufacturing method in this manner, as losses in active oxygen would occur as a result of the catalytic effect of the metals exerted during the manufacturing process.

Accordingly, I prefer either to add the finely divided metal of the platinum group, or mixture of such metals, after precipitation of the zinc peroxide and adjustment of its pH value, but before filtering and washing; or, alternatively, by its introduction into the dry product after the filtering, washing, and drying steps are completed. In the first procedure the catalyst is added to the zinc peroxide suspended in the aqueous liquid, and during the subsequent steps of filtering, washing and drying the insoluble metal compound is thoroughly distributed throughout the mass of therapeutic agent. In accordance with the second procedure a separate dry-mixing operation is necessary, which operation, carried out in accordance with the procedure described below, involves thorough and even distribution of the catalyst throughout the mass. As losses in active oxygen occur during filtering and washing steps when the catalyst is added to the zinc peroxide, although these losses are not so great as those resulting when the catalytic agent is added to the reaction mixture as, for example, in the process described in Jones et al. Patent 2,304,098, ordinarily I prefer to add the finely divided metal catalyst to the filtered, washed and dried therapeutic zinc peroxide in a separate subsequent dry-mixing operation.

In adding the insoluble catalytic metal I have found it desirable first to admix the metal with a diluent substance which, together with the adhering catalyst, is later incorporated with the zinc peroxide. If the catalytic agent is added directly to the zinc peroxide it is very difficult to admix the two in such a manner that thorough distribution of the relatively small amount of metal throughout the much larger amount of zinc peroxide is secured. Since the amount of metal catalyst is, in comparison to the amount of zinc peroxide, relatively very small, direct addition and mixing requires vigorous and extensive mixing operations which uniformly result in considerable losses of active oxygen by decomposition of the product during the mixing.

Accordingly, it is preferred first to admix the relatively small amount of finely-divided metal catalyst, or substance forming said finely-divided metal catalyst in situ, with a relatively larger amount of diluent material which will not decompose or undergo undesirable changes during the incorporation step, this amount of diluent material, however, being ordinarily considerably less than that of the zinc peroxide which is to be activated. In place of adding the finely-divided metal directly, it is possible to admix with the diluent substance a soluble compound or salt of one of the specified metals, platinum, palladium, rhodium, ruthenium, iridium, or osmium, which compound or salt is converted to the insoluble metal by reduction prior to the incorporation of the treated diluent substance with the zinc peroxide. After the finely-divided metal catalyst is thoroughly distributed throughout the diluent material, the diluent containing the catalyst is then admixed directly with the zinc peroxide it being possible, by reason of the relatively larger volumes involved, to obtain thorough distribution of diluent substance and catalyst throughout the zinc peroxide without the necessity for exhaustive mixing operations with resulting undesirable losses of active oxygen.

Among diluent substances possible for use in this method of incorporating the finely-divided metal catalyst I prefer to utilize zinc oxide. The zinc oxide containing the desired catalyst can then be thoroughly admixed with the zinc peroxide to distribute the catalytic agent throughout the mass of zinc peroxide without danger of decomposition of the peroxide to an undesirable extent. It may be noted that zinc oxide, preferred as my diluent agent when this method of incorporating the finely-divided metal catalyst is utilized, does not constitute an undesirable impurity in zinc peroxide of therapeutic grade since amounts of the oxide up to 40 to 50% by weight are normally present in commercially available grades of zinc peroxide as now prepared for therapeutic use. The zinc oxide diluent utilized may thus consist of from 10% to 100% of the amount of zinc peroxide to be activated, the particular amount of diluent substance selected in any case being so selected as to permit convenient introduction of the finely-divided metal catalyst by subsequent dry-mixing into the main mass of therapeutic product.

When the catalytic agent is first added to a diluent substance, the latter being then added to the zinc peroxide, it is also possible to secure thorough distribution of the metal catalyst throughout the main body of diluent substance prior to mixing by the chemical reduction of a soluble compound of the metal. In this method when zinc oxide, for example, is added as a diluent, the finely divided metal may either be added to a slurry of the zinc oxide, or the metal of the platinum group may be precipitated in situ with the zinc oxide from a water-soluble compound of the metal. In accordance with the latter procedure a slurry of the diluent in water is prepared and the desired amount of a water-soluble metal salt or salts of the metals platinum, palladium, rhodium, ruthenium, iridium or osmium necessary to give the desired concentration of finely-divided metal catalyst is added thereto and dissolved therein. Upon the addition of a reducing agent, such as formaldehyde, in the necessary amount to the resulting slurry the compound of the catalytic metal is reduced, the metal catalyst being precipitated in finely-divided form in the slurry. The finely-divided metal is thus thoroughly distributed throughout the mass of zinc oxide diluent which is then added to the zinc peroxide and thoroughly admixed with the latter in order to secure the desired even and thorough distribution of the catalyst. In following this procedure when, for example, platinum is to constitute the finely-divided metal catalyst, a soluble salt or compound thereof such as potassium chloroplatinate or chloroplatinic acid is added to the zinc oxide slurry. Formaldehyde, or other reducing agent, is then added to precipitate the platinum metal in contact with the zinc oxide, which is then filtered off, dried, and thoroughly admixed with the main body of therapeutic zinc peroxide. In this way losses in active oxygen during the process of manufacturing the zinc peroxide and thoroughly distributing the catalyst through said product are avoided, since there is no danger of decomposition of the zinc oxide diluent during the step of forming the finely-divided catalytic metal therein in situ.

The amount of finely-divided metal catalyst in parts per million necessary to yield a therapeutic grade zinc peroxide having the desired gas evolution rate will vary somewhat depending on the particular finely-divided metal catalyst selected. For the specified metals of the platinum group I have found that the amount of catalyst present should vary from 15 parts per million to 150 parts per million, based on the total weight of the zinc peroxide preparation, including diluent substances if any are introduced. The use of larger amounts of finely-divided metal catalyst is, of course, not ordinarily objectionable, although I have found that there is generally little advantage in having the finely-divided metal catalyst present in amounts in excess of about 150 parts metal per million parts of zinc peroxide. The specified amounts may be constituted by one metal alone, or two or more of the metals of the platinum group may be employed conjointly to yield an amount of finely-divided metal catalyst falling within the specified percentage range.

The following examples, showing the incorporation of finely-divided platinum as the catalytic agent in therapeutic zinc peroxide, may be taken as typical, regardless of the particular metal of the second and third transition series of group VIII of the periodic table, or mixture thereof, selected.

*Example 1*

Chloroplatinic acid containing 5.42 grams of platinum metal was added to 10 lbs. of U. S. P. zinc oxide slurried in eight gallons of water. There was then added to the hot well-stirred slurry fifty grams of sodium hydroxide and sixty cc. of 37% formaldehyde solution. The zinc oxide containing the precipitated metal catalyst was then washed and dried.

The zinc oxide containing the catalytic agent was then tumbled with 150 lbs. of dry zinc peroxide until an intimate mixture of the two was secured. This resulted in an activated therapeutic zinc peroxide of high activity and effective antiseptic action. The active oxygen recovered as zinc peroxide was approximately 60%, as compared with recoveries by the usual commercial process using water-soluble catalysts (manganese, copper, and iron compounds) of about 49%.

The figures regarding gas evolution of the new therapeutic zinc peroxide are given in the following table:

|  | Total Gas Evolved in cubic centimeters | | | Gas Evolved in cubic centimeters per hour in 20 to 24 hour period |
| --- | --- | --- | --- | --- |
|  | After 1 hr. | After 20 hrs. | After 24 hrs. | |
| Zinc peroxide activated by addition of platinum catalyst | 7.5 | 41.7 | 44.7 | 0.72 |
| Typical commercial product | 14.8 | 27.7 | 29.7 | 0.50 |

These values were determined using standard five-gram samples of the peroxides, and by following the standard procedure established by the medical profession and referred to in the Webb patent, No. 2,287,847, for example.

*Example 2*

The catalyst prepared as in Example 1, but not subjected to drying, was reslurried after washing and stirred into 150 lbs. of zinc peroxide. The resulting product containing the metallic platinum catalyst was dried in a drum.

There resulted a very satisfactory therapeutic grade zinc peroxide product which was very effective in the treatment of wounds and infections. The rate of gas evolution in cubic centimeters per hour and the total gas evolution at the end of various periods are given in the following table:

| Total Gas Evolved in cubic centimeters | | | Gas evolved in cubic centimeters per hour in 20 to 24 hour period |
| --- | --- | --- | --- |
| After 1 hr. | After 20 hrs. | After 24 hrs. | |
| 13.8 | 42.2 | 45.7 | 0.90 |

These values were determined in accordance with the standard test procedure referred to in Example 1, using a 5-gram sample of the zinc peroxide product.

It is apparent that various widely different modifications of my invention may be practiced without departing from the spirit or scope thereof. The invention is therefore to be interpreted in the light of the foregoing disclosure and the appended claims.

I claim:

1. The method of preparing therapeutic zinc peroxide of satisfactory gas evolution rate and high activity which comprises mixing with a diluent material which is compatible with said zinc peroxide an aqueous solution of a compound, reducible to the metallic state, of a metal selected from the group which consists of the metals of the second and third transition series of group VIII of the periodic table, reducing, in situ in said diluent, said compound to the metallic state, drying said diluent containing said metal, and then incorporating, by dry mixing, said diluent material containing the metallic catalyst with the mass of zinc peroxide whose gas evolution rate is to be catalyzed, whereby said metal catalyst is distributed throughout the mass of said therapeutic zinc peroxide.

2. The method of preparing therapeutic zinc peroxide of satisfactory gas evolution rate and high activity which comprises mixing with zinc oxide an aqueous solution of a compound, reducible to the metallic state, of a metal selected from the group which consists of the metals of the second and third transition series of group VIII of the periodic table, reducing, in situ in said zinc oxide, said compound to the metallic state, drying said zinc oxide containing said metal, and then incorporating, by dry mixing, the zinc oxide containing the metal catalyst with a mass of zinc peroxide, whereby the resulting product constitutes therapeutic zinc peroxide of high activity containing a finely divided metal catalyst.

3. The method of preparing therapeutic zinc peroxide of satisfactory gas evolution rate and high activity which comprises mixing with zinc oxide an aqueous solution of a compound, reducible to the metallic state, of a metal selected from the group which consists of the metals of the second and third transition series of group VIII of the periodic table, reducing in situ in said zinc oxide, said compound to the metallic state by the addition of formaldehyde, drying said zinc oxide containing said metal, and then incorporating said zinc oxide containing said metal catalyst with a mass of zinc peroxide and dry mixing the two together, whereby to produce a dry, solid activated, therapeutic zinc peroxide.

JAMES H. YOUNG.

REFERENCES CITED

The following references are of record in the file of this patent:

UNITED STATES PATENTS

| Number | Name | Date |
| --- | --- | --- |
| 2,105,835 | Krause | Jan. 18, 1938 |
| 2,245,495 | Pemble | June 10, 1941 |
| 2,304,098 | Jones et al. | Dec. 8, 1942 |
| 2,287,847 | Webb | June 30, 1942 |
| 2,266,835 | Webb | Dec. 23, 1941 |
| 2,149,682 | Jorgensen | Mar. 7, 1939 |
| 2,205,872 | Berry | June 25, 1940 |
| 1,869,518 | Smith | Aug. 2, 1932 |
| 1,729,590 | Morris | Sept. 24, 1929 |
| 2,052,175 | Haurand | Aug. 25, 1936 |
| 2,042,173 | Files | May 26, 1936 |
| 969,073 | May | Aug. 30, 1910 |
| 2,276,503 | McHan | Mar. 17, 1942 |
| 1,157,993 | McElroy | Oct. 26, 1915 |
| 1,913,774 | Seib | June 13, 1933 |
| 2,285,277 | Henke | June 2, 1942 |
| 1,222,608 | Dewar | Apr. 17, 1917 |

FOREIGN PATENTS

| Number | Country | Date |
| --- | --- | --- |
| 452,889 | Great Britain | Sept. 1, 1936 |